United States Patent
Marcu et al.

(10) Patent No.: US 8,181,046 B2
(45) Date of Patent: May 15, 2012

(54) TRANSPARENT SELF-HIBERNATION OF NON-VOLATILE MEMORY SYSTEM

(75) Inventors: Alon Marcu, Tel Mond (IL); Ori Stern, Modeen (IL)

(73) Assignee: SanDisk IL Ltd., Kfar Saba (IL)

( * ) Notice: Subject to any disclaimer, the term of this patent is extended or adjusted under 35 U.S.C. 154(b) by 738 days.

(21) Appl. No.: 12/260,744

(22) Filed: Oct. 29, 2008

(65) Prior Publication Data
US 2010/0106886 A1    Apr. 29, 2010

(51) Int. Cl.
*G06F 1/32*    (2006.01)
*G06F 1/00*    (2006.01)
*G06F 12/00*    (2006.01)

(52) U.S. Cl. ......... 713/320; 713/300; 713/323; 711/118

(58) Field of Classification Search .................. 713/300, 713/320, 323; 711/118
See application file for complete search history.

(56) References Cited

U.S. PATENT DOCUMENTS

| | | | |
|---|---|---|---|
| 5,487,181 A | 1/1996 | Dailey et al. ................... 455/89 |
| 5,682,273 A | 10/1997 | Hetzler .......................... 360/75 |
| 5,822,582 A | 10/1998 | Doragh et al. ................ 395/652 |
| 5,943,692 A | 8/1999 | Marberg et al. ............... 711/203 |
| 6,038,671 A * | 3/2000 | Tran et al. ..................... 713/300 |
| 6,209,088 B1 | 3/2001 | Reneris .............................. 713/1 |
| 6,347,370 B1 * | 2/2002 | Grimsrud .......................... 713/1 |
| 6,546,472 B2 * | 4/2003 | Atkinson et al. ............... 711/156 |
| 6,591,329 B1 | 7/2003 | Kakinuma et al. ............ 711/103 |
| 6,609,182 B1 | 8/2003 | Pedrizetti et al. ............. 711/159 |
| 6,954,864 B2 * | 10/2005 | Schelling ..................... 713/310 |
| 7,305,502 B2 | 12/2007 | Kadatch et al. ................. 710/68 |
| 7,594,073 B2 * | 9/2009 | Hanebutte et al. ............ 711/113 |
| 2004/0073761 A1 * | 4/2004 | Kato et al. ..................... 711/165 |
| 2005/0108589 A1 * | 5/2005 | Kadatch et al. ............... 713/330 |
| 2006/0161796 A1 * | 7/2006 | Cromer et al. ................ 713/323 |
| 2007/0150760 A1 | 6/2007 | Nowlin ......................... 713/300 |

* cited by examiner

*Primary Examiner* — Ji H Bae
(74) *Attorney, Agent, or Firm* — Martine Penilla Group, LLP

(57) ABSTRACT

A memory system self-initiates hibernation mode and responds to host commands issued during hibernation within a host protocol timeout period. Hibernation mode is entered after controller state data has been stored and while no host command to the memory system is pending. Power to volatile data storage is diminished during hibernation mode. Upon receiving a host command during hibernation mode, power is restored and a reduced portion of the controller state data is read from non-volatile memory. A removable data storage device or a portable electronic device with embedded data storage may be constructed with such a self-hibernating memory system.

18 Claims, 5 Drawing Sheets

TRANSPARENT SELF-HIBERNATION OF NON-VOLATILE MEMORY SYSTEM

BACKGROUND OF THE INVENTION

The present invention relates to power conservation in electronic devices, and more particularly in those making use of flash memory.

Daily use of electronic devices such as cell phones, laptops, personal digital assistants (PDAs), and digital music players is becoming increasingly widespread. A limitation on the ability to make full use of these portable devices is the battery life of the host device. As the electronics footprints becomes ever smaller, current leakage problems especially in extreme conditions are growing larger. Thus, electronic device and memory device design changes that can result in less current usage can have a beneficial effect on extending the useable life of the battery between charges.

One approach employed by computers is a hibernation/waken function that allows a computer to power down and subsequently restore processor state in executable memory after the computer power down without rebooting the operating system. Such a system is disclosed in U.S. Pat. No. 6,209,088 (Reneris).

With regard to removable data storage devices that do not require a boot up because operating system code is not stored on the device, the host can turn off the power supply to the data storage device to conserve on power. In the case of a flash device, such a complete termination of power to the device will cause a penalty in terms of latency. Delay is incurred upon turning the flash device back on because of the need to do a full mount.

In the case of a flash device that can decide by itself to enter a standby mode, the memory system RAM will need to remain awake so as to answer incoming host requests within the time constraints required by the host protocol. While power to most internal device processes may be stopped, if the RAM remains awake, the desired power conservation is compromised. Maintaining the current state in the RAM requires significant current thereby mitigating possible gains of the standby mode.

SUMMARY OF THE INVENTION

In accordance with an embodiment of the present invention, a memory system can be operated to enter hibernation mode and yet respond to a host command prior to expiration of a host protocol timeout. This method includes monitoring commands from the host so that upon detecting a lull in the commands, entry into hibernation mode is initiated. As such, controller state data is stored from volatile data storage to non-volatile memory. Hibernation mode can be entered once the controller state data has been stored and while no host command to memory system is pending. Upon entering hibernation mode, power to the volatile data storage is diminished. While in hibernation mode, if a host command is received at the memory system, power is restored to the volatile data storage. Completion of the host command will be signaled prior to expiration of the host protocol timeout. In accordance with one method for being able to signal completion of the host command before the host protocol timeout, only a reduced portion of the controller state data is read from the non-volatile memory sufficient to resolve and signal completion of the host command. The remaining controller state data is read from the non-volatile memory after the completion of the host command has been signaled.

In the case of a write command from the host during hibernation, the ability to signal completion before the protocol timeout may be accomplished by buffering the data to be written into a cache. Such data in a cache would be written into the non-volatile memory after signaling completion to the host. In accordance with this approach, if a host sends a command request to read when the memory system has not completely awakened from hibernation, the system will first determine whether data for the memory location to be read has been buffered in a cache before executing the read for that location.

In accordance with an embodiment of the invention, if a host command is received after initiating entry into hibernation mode but before hibernation mode is entered, controller state data stored in non-volatile memory in response to initiating hibernation mode may be marked as invalid and entry into hibernation mode aborted. In accordance with a further particular method of the invention, pointers may be stored in a designated portion of the non-volatile memory in order to provide guidance for finding the controller state data that has been stored in the non-volatile memory. In this approach, at least one of the pointers is read upon restoring power so that the referenced controller state data may be read and stored into the volatile data storage. More particularly, the pointers may be stored in a specified first n blocks of reprogrammable, non-volatile memory organized into distinct blocks of simultaneously erasable cells, where n blocks is larger than the amount of memory required to store the pointers. In this method, as entry into hibernation mode and restoration of power are reiterated, the pointers are stored into different positions within the n blocks thereby reducing wear on any specific block in the non-volatile memory A removable data storage device of the present invention includes a non-volatile memory along with its memory controller and associated volatile data storage including a memory system RAM and a plurality of hardware components. The volatile data storage stores controller state data during operation of the memory system. Any of the memory system RAM, the non-volatile memory or a ROM includes program code for self-initiating a hibernation mode that diminishes power to the memory system RAM. Additional program code is included for acting upon restoration of power to the memory system RAM. This code responds to a host command by restoring from the non-volatile memory to the memory system a reduced portion of controller state data based upon that host command. In this manner, the host command is acted upon and completion is signaled back to the host processor prior to expiration of a host protocol time out. The non-volatile memory may be reprogrammable non-volatile memory organized into distinct blocks of simultaneously erasable cells. The removable data storage device may further include program code responsive to a write command from the host upon restoration of power to the memory system RAM for buffering write data in a cache. In addition, program code responsive to a read command from a host directed to a memory location determines whether data for that memory location has been buffered in a cache before executing the read for that location. The removable storage device further includes a host interface that operates during hibernation mode to detect an incoming host command and for causing power to the memory system RAM to be restored responsive thereto.

In accordance with a portable electronic device according to the present invention, a memory system includes a memory controller, volatile data storage for storing controller state data during operation of the memory system and non-volatile memory. A battery provides power to the memory system.

The electronic device includes a host processor and a host interface for monitoring commands from the host processor. The memory system includes program code for initiating a hibernation mode in the memory system in response to detecting a lull in the commands from the host processor. Additional program codes store controller state data from the volatile data storage to the non-volatile memory prior to entering hibernation mode. Additional program code causes reduction of battery power to the memory system upon entering hibernation mode. When the host interface receives a host command during hibernation mode, further program code in the memory system responds by performing the host command before restoring all of the controller state data from the non-volatile memory to the memory system RAM so that completion of the host command gets signaled back to the host processor prior to expiration of the host protocol timeout. In a preferred embodiment, the memory system may further include a program code for storing pointers in a designated portion of the non-volatile memory, the pointers providing guidance for finding the controller state data stored in the non-volatile memory. The portable electronic device may be any of a variety of devices such as personal digital assistants, digital audio players, digital cameras, mobile phones or laptop computers. Thus, the portable electronic device may include a microphone, a speaker, a receiver and a transmitter for conducting wireless voice communications. Alternatively or in addition, the portable electronic device may include a keypad, a receiver and a transmitter for conducting electronic mail communications.

BRIEF DESCRIPTION OF THE DRAWINGS

The foregoing features of the invention will be more readily understood by reference to the following detailed description, taken with reference to the accompanying drawings, in which.

DETAILED DESCRIPTION OF THE SPECIFIC EMBODIMENTS

Figure 1:
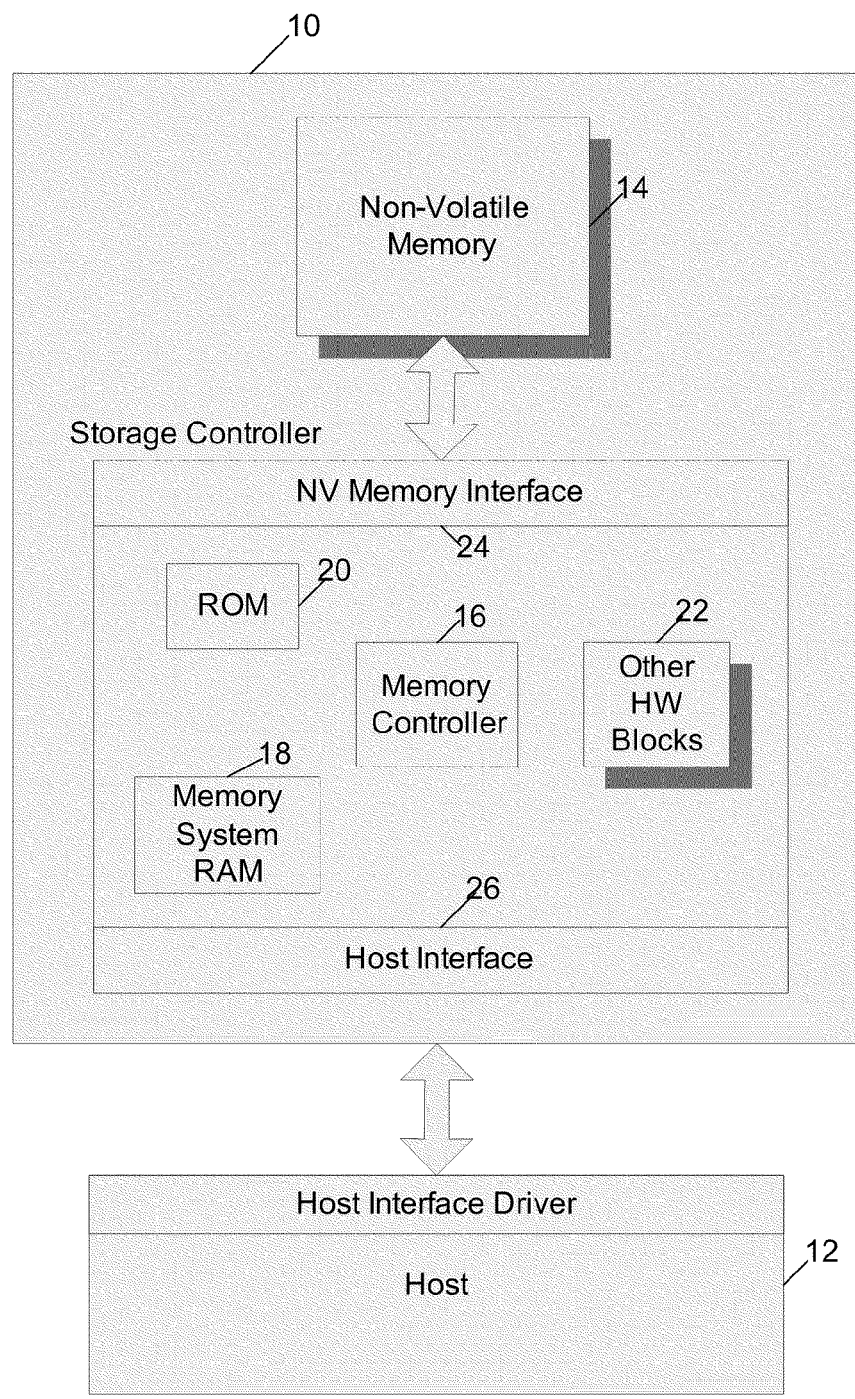
FIG. 1 is a block diagram of a removable data storage device according to an embodiment of the present invention.

FIG. 1 provides a diagram of the major components of a removable storage device 10. The storage device 10 may be used for delivering or maintaining data to or for a host device such as a computer. Data is stored into a non-volatile memory 14. The stored data may include any kind of digital information including user data, memory system program code, host computer program code or other such information. While in a preferred embodiment, the non-volatile memory 14 is flash memory, the present invention may be used with a variety of non-volatile memory types. Flash memory is characterized by its reprogrammability, in which the non-volatile memory is organized into distinct blocks of simultaneously erasable cells.

For making use of the non-volatile memory, a memory system also includes a memory controller and memory system RAM. A memory controller 16 is a central processing unit (CPU) that performs operations in accordance with program code. The memory controller 16 can read program code from any of the memory system RAM 18, the non-volatile memory 14, or in most circumstances, from a ROM 20 containing the program memory. Memory system RAM 18 provides volatile data storage that stores among other things controller state data during operation of the memory system. Most importantly, the controller state data includes a table mapping host driver addresses to the non-volatile memory physical addresses. In addition, the general internal state of the software running in the memory controller is maintained with such items as stack, globals, controller internal state, code memory, constant variables, etc. The memory system may also include other hardware blocks 22 such as ECC, DMA, Hash, AES, RSA, to name a few. The hardware blocks may also contain volatile data storage, such as registers or buffers, that maintain state data that must be stored in non-volatile memory 14 during hibernation.

A non-volatile memory interface 24 monitors and facilitates read and write communications with a non-volatile memory 14. In addition, the non-volatile memory interface 24 maybe used for erasing blocks of data in the non-volatile memory 14. The state of the non-volatile memory interface is maintained therein with such variables as the bus configuration, polarity, frequency and others as is known in the art.

The memory controller 16 communicates with the host through a host interface 26. The host interface monitors communications to and from the host 12. The memory system is usually contained on a single integrated circuit chip either without the non-volatile memory or with a memory cell array. Even if a memory cell array is included on the memory system circuit chip, an additional one or more chips that each contains only a non-volatile memory array and associated circuitry will often be included in the storage device 10. Storage devices as described above with respect to FIG. 1 are well known in the art. In accordance with embodiments of the invention, certain program codes are included within the memory system for operating the storage device in accordance with a manner taught herein.

The embodiments of the invention relate to entering and exiting from a hibernation mode. During hibernation, power to the memory system RAM 18 and hardware blocks 22 is diminished. In particular, power is removed from non-essential portions of the memory system RAM 18. This may turn power off to the entire RAM 18 or may leave a portion of the RAM with power so that certain state data or program code will remain relatively available and operational immediately upon coming out of hibernation. Thus, the program code for coming out of hibernation or for entering hibernation may be stored in any of the ROM 20, memory system RAM 18 and/or non-volatile memory 14. Power for the memory system RAM in the removable storage device 10 is typically provided from the host 12. However, in other embodiments, a power source may be provided on the storage device 10 itself.

Figure 2:
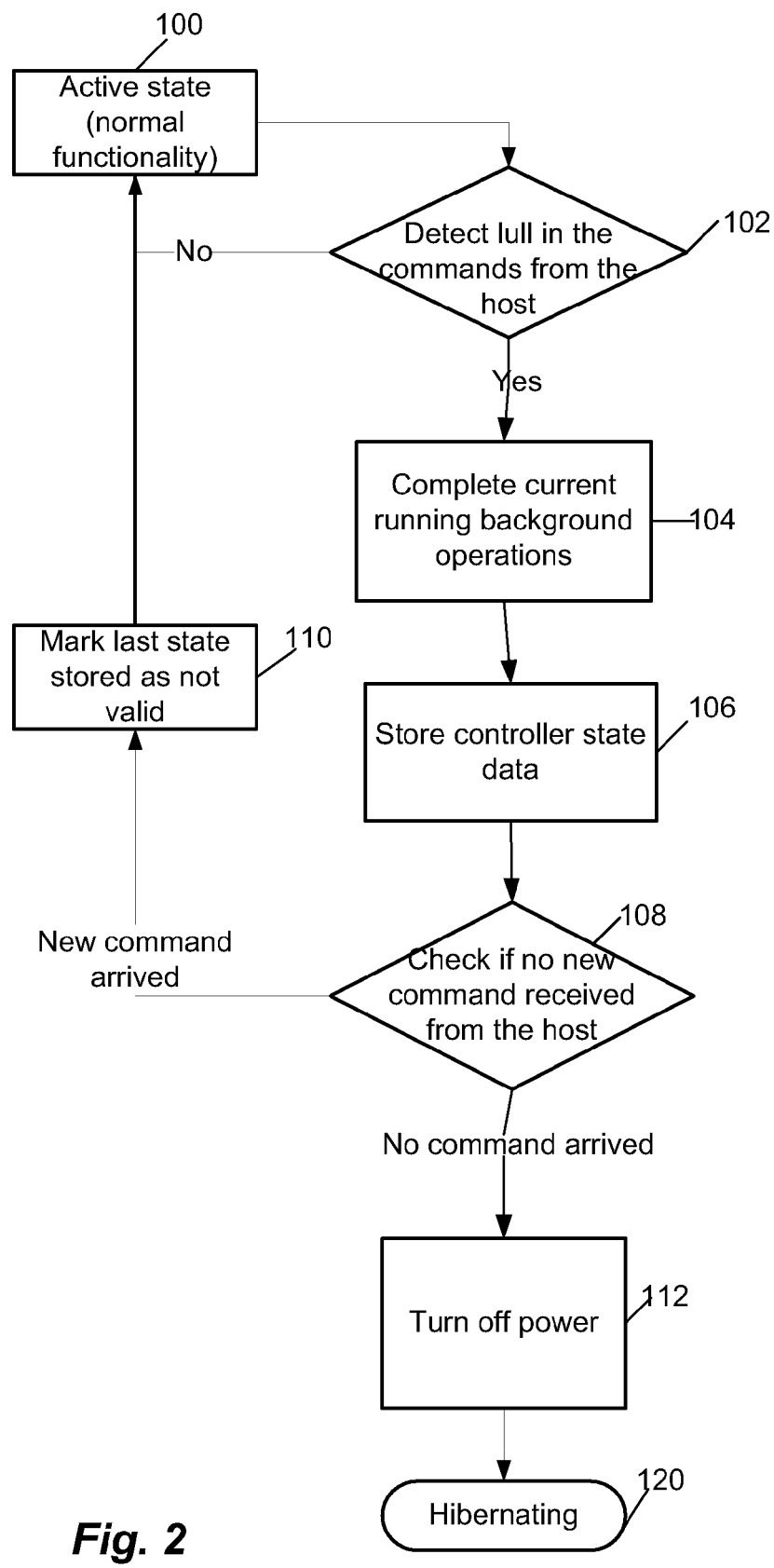
FIG. 2 is a flow chart of a method for entering hibernation mode in accordance with an embodiment of the present invention.

Referring now to FIG. 2, program code for self-initiating a hibernation mode shall be described. Hibernation mode will end an active state 100 under a certain predetermined and programmed condition. In accordance with a preferred embodiment of the invention, the program monitors the time from the last host command. When a threshold amount of time elapses without a host command, the memory controller 16 will initiate entry into hibernation mode. More generally speaking, if a lull in commands from the host 102 is detected entry into hibernation mode is initiated. Any background operations currently running in the memory system will be permitted to complete 104. The process and program then proceeds to store 106 controller state data from the volatile data storage, such as memory system RAM and hardware blocks, to the non-volatile memory 14. Stored state data is marked as valid. As the controller state data is being stored, the host interface 26 monitors any communications from the host 12. If a host command is received 108, the entry into hibernation mode will be interrupted. Any controller state data stored before the interruption will be marked as not valid 110. This is a simple approach to the interruption. More complicated program codes and algorithms may be implemented to invalidate only those states that require it. For example, if the host command is a read and only read commands are received before reinitiating entry into a hibernation mode, it may not be necessary to invalidate the storage controller state data and the hibernation process in the next iteration may proceed from where it left off. Even more complicated heuristics may be employed to consider which states are changed by the host command, for example, if there is a write command so that only those states are invalidated. Hibernation mode will not be entered until all of the essential controller state data has been stored in non-volatile memory 14.

In particular embodiments, the controller state data includes the host driver address to non-volatile physical address translation table, the hardware states and the internal memory controller 16 states. Typically, the address translation table contains the most important data, in particular with respect to a flash based storage device. The table contains a mapping between the virtual addresses of sectors as used by the host driver and the physical addresses of the sectors in the flash non-volatile memory. Thus, the address translation table must be stored in order to enter hibernation and must be reconstructed after hibernation.

After the controller state data has been stored and while no host command to memory system is pending, program code causes power to be diminished 112 to the memory system RAM 18. In addition power to the memory controller 16 and other relevant hardware components is diminished or turned off. Once this power has been diminished the storage device is in hibernation mode and power usage is being conserved.

While it is desirable to conserve the power used by the memory system, it would be undesirable to allow such power conservation to interfere with the needs of the host. In accordance with aspects of embodiments of the present invention, hibernation is entered and exited transparent to the host 12. Host operation is thus unaffected by hibernation.

Figure 3:
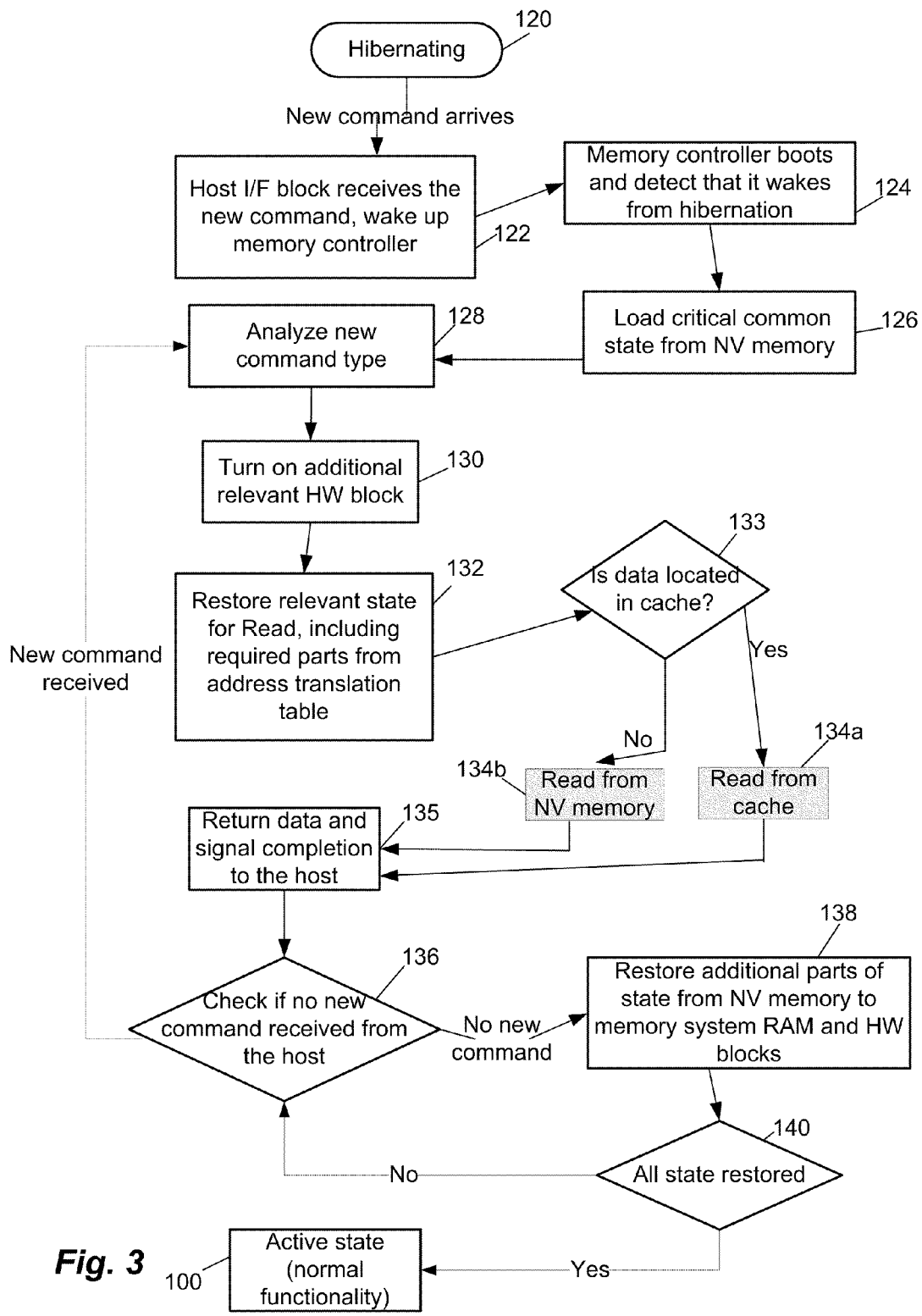
FIG. 3 is a flow chart for handling a read command upon coming out of hibernation mode in accordance with an embodiment of the present invention.
Figure 4:
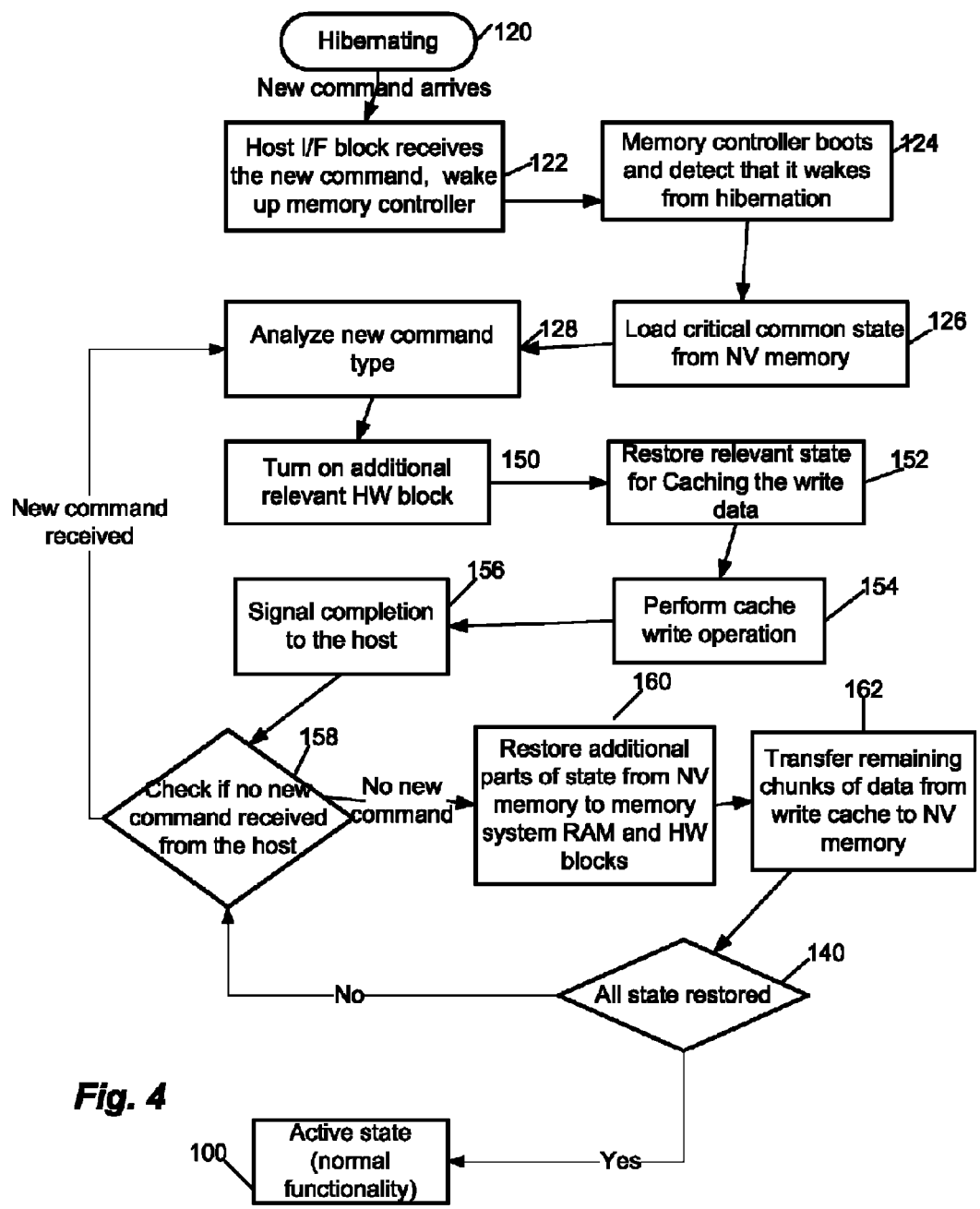
FIG. 4 is a flow chart for handling a write command upon coming out of hibernation mode in accordance with an embodiment of the present invention.

Referring now to FIGS. 3 and 4, program codes for exiting from hibernation mode in such manner as to signal completion of a new host command prior to expiration of the host protocol timeout shall be described. With regard to FIG. 3, the situation in which a read command is received by the host interface 26 shall be discussed. The host interface 26 remains powered during the hibernation mode. Thus, when a host command comes from host 12, host interface 26 restores power to the storage device 10. Thus, the memory controller 16 wakes up 122. The memory controller boots up according to its programs and detects 124 that it is awakening from hibernation mode 24. The indication of hibernation mode may be stored in non-volatile memory 14. Alternatively, the indication that this system is in hibernation mode may be stored in a section of memory system RAM 18 that has maintained power during hibernation mode. In accordance with another alternative, other hardware 22 may be used to maintain and report the indication that memory controller is being booted up from hibernation mode. To recover from hibernation mode, at least a portion of program code is available in non-volatile memory 14 or an active portion of memory system RAM. The portion contains sufficient direction to locate any remaining code for carrying out the recovery process as described below with respect to FIGS. 3 and 4. Thus, if necessary, any additional code will be loaded and run immediately following the boot sequence.

Any critical state data required by the memory controller 16 is loaded 126 from non-volatile memory 14. Memory controller 16 analyzes 128 the new command type received from the host. Based on the determination that the command is a read as indicated for FIG. 3, hardware blocks 22 relevant to the read operation would be turned on 130. Rather than read and restore all of the controller state data from the non-volatile memory 14 to the memory system RAM 18 and hardware blocks 22, only a reduced portion of the controller state data is restored 132 based upon the host command. For example, only those portions of the address translation table relevant to the read request are required at this point. The read command can then be quickly handled. The option of using a cache will be discussed below with respect to FIG. 4. If the memory location to be read is in cache, the cache is read 134a. If the memory location is not in cache, a normal read from non-volatile memory takes place 134b. In either case, the read data is returned to the host 135. Thus, completion of the read command is signaled to the host in an accelerated manner without waiting for complete restoration of the controller state data.

If no new host commands are pending 136, the memory controller 16 can return to the task of completing restoration 138 of the controller state data from non-volatile memory 14 to the memory system RAM 18 and into the appropriate hardware blocks 22. Once the entire state data has been restored 140, the system returns to active state 100 with normal functionality. If new commands are received before all the controller state data has been restored, the program code continues to retrieve a reduced portion of the controller state data so that these additional commands can be satisfied in a sufficiently short time period so as not to allow for expiration of a host protocol timeout.

Referring now to FIG. 4, the procedure for coming out of hibernation mode 120 is, of course, the same until in the analysis 128 of the host command, it is determined that the command is a write. The memory controller 16 will cause those hardware blocks relevant to the write operation to be turned on 150. In order to accelerate the memory device's response to the write command, the memory controller 16 prepares to cache the write data. Thus, the memory controller 16 restores 152 a reduced portion of the controller state data, which in this case would be at least that data relevant to caching the write data. Once this has been completed, the memory controller 16 is ready to perform the cache write operation 154. The cache may be in memory system RAM 18 or some other component on the memory system chip or even in data storage outside the memory system chip or split among any of these. A completion signal is sent back to the host 156. By only restoring a reduced portion of the controller state data, the memory storage device 10 has been able to enter hibernation mode and come out of hibernation mode without ever indicating such to the host. Indeed, the operation is entirely transparent to the host 12. If no new commands from the host are pending 158, the memory controller 16 can resume restoration 160 of the remainder of the controller state data from the non-volatile memory 14 into the memory system RAM 18 and hardware blocks 22. Also, any data written into the cache is transferred into non-volatile memory 14 for permanent storage. Once the restoration of controller state data and cache data has been completed 140 the system enters its normal active state 100.

In accordance with a specific embodiment for facilitating and accelerating the storage of controller state data in a non-volatile memory, pointers may be stored in a designated portion of the non-volatile memory. The pointers will indicate where within the non-volatile memory 14 corresponding controller state data can be found. Thus, the pointers provide guidance for finding the controller state data stored in the non-volatile memory. In a flash non-volatile memory, the first blocks of the reprogrammable non-volatile memory are most easily accessible. Thus, the pointers are stored amongst the first n blocks where n is a number of blocks larger than the amount of memory required to store all the pointers. There is a trade off between allowing n to be large and thus use up valuable memory space and, on the other hand, for n to be too small in which case iterations through the hibernation mode will result in more frequent erasure of these first sets of blocks undesirably reducing the lifetime of the flash non-volatile memory. To aid in reducing the problem of overuse and uneven wear of these blocks containing pointers, each time the system enters into a hibernation mode, the pointers will be stored in different positions within the n blocks designated for the pointers. Thus, the same block of memory cells will not need to be erased each time hibernation mode is entered and recovered from. In the case where this storage of pointers is used by the memory system, the restoration of controller state data 132, 152 from the non-volatile memory to the memory system RAM 18 and other hardware blocks can be accomplished by reading at least one of the pointers from the designated portion of the non-volatile memory and then reading the controller state data as found in the non-volatile memory pursuant to that at least one pointer.

Figure 5:
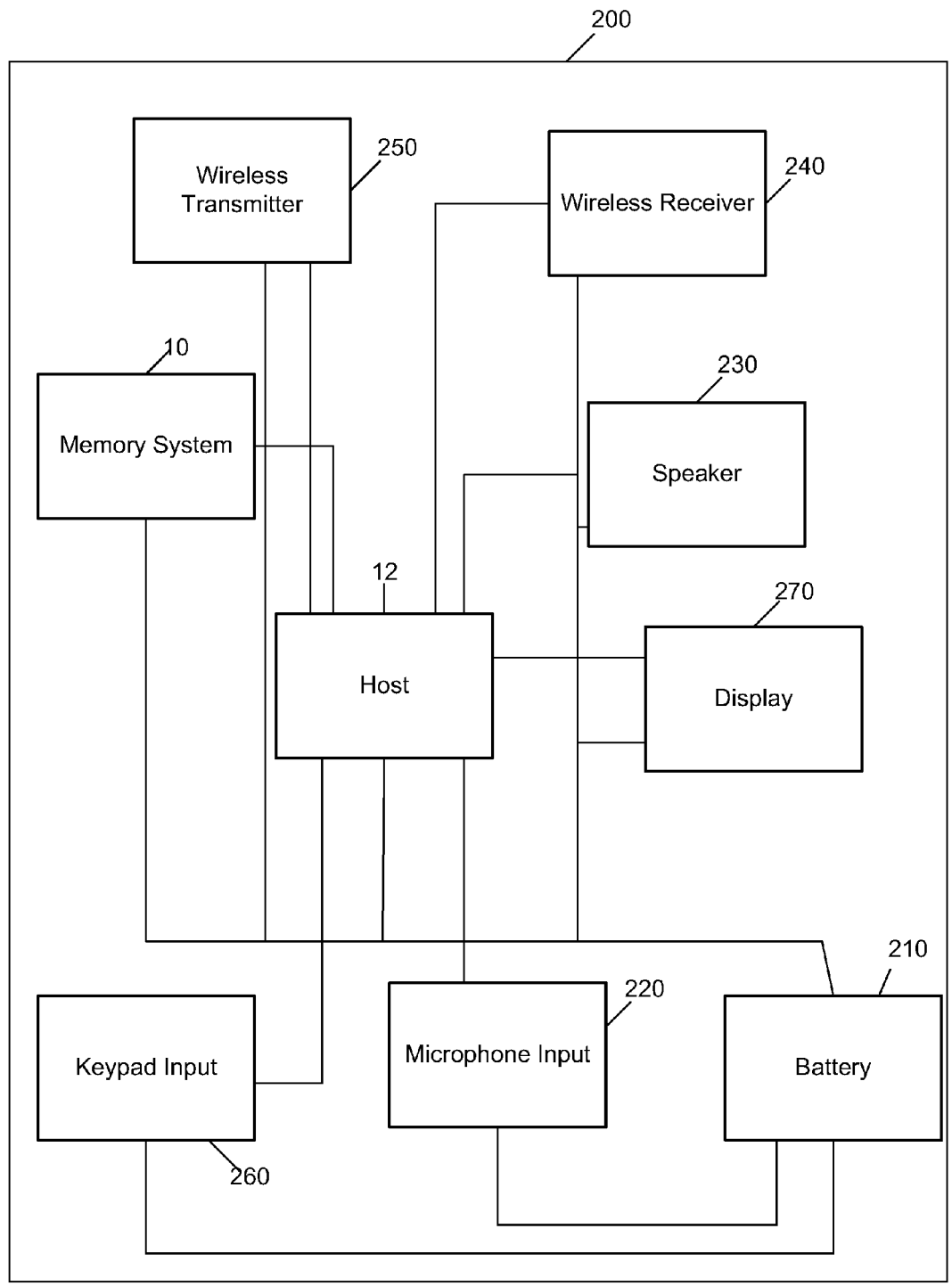
FIG. 5 is a block diagram of a portable electronic device in accordance with an embodiment of the present invention.

Referring now to FIG. 5, a portable electronic device 200 of the present invention is schematically shown. The portable electronic device 200 may be any of a personal digital assistant with email communication capability, a laptop computer, digital audio player, digital camera, mobile phone or the like. A portable electronic device 200 of the present invention will include a battery 210 whose life is further extended by the program code in the memory system 10 that permits self-initiation of hibernation mode and recovery from that mode transparent to the host. The self-initiated hibernation mode is particularly beneficial in such portable electronic devices with embedded memory systems. In the past, embedded memory systems are typically always kept powered to be ready for host re-boot, given that the memory systems often also contain the host operating system code and related critical data. Self-hibernation and recovery as described herein makes a valuable power conservation technique available to portable electronic devices with embedded memory systems.

The portable electronic device 200 may include a microphone 220, a speaker 230, a receiver 240 and transmitter 250 for conducting wireless communications. Alternatively, or in addition, a portable electronic device may include a keypad 260 allowing the entry of text message, e-mail or other electronic mail communications. Typically, the portable electronic device will include a display 270 for showing electronic communications, telephone numbers, address books and other graphic interfaces as is well known in the art. The battery 210 associated with the portable electronic devices of the present invention experience a longer useful life between charges due to the ability of the system to enter hibernation mode automatically without interfering with the host operations.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of operating a memory system comprising:
monitoring commands to the memory system from a host;
initiating entry into hibernation mode in the memory system in response to detecting a lull in the commands from the host;
storing controller state data from volatile data storage to non-volatile memory in response to said initiating;
entering hibernation mode by diminishing power to the volatile data storage, after the controller state data has been stored and while no host command to the memory system is pending;
receiving at the memory system a host command while the memory system is in the hibernation mode;
restoring power to the volatile data storage in response to the host command;
signaling completion of the host command back to the host prior to expiration of a host protocol timeout; and
receiving at the memory system a host command after initiating entry into hibernation mode, marking as invalid any controller state data stored in response to said initiating and aborting entry into hibernation mode.

2. The method of claim 1 further comprising storing pointers in a designated portion of non-volatile memory of the system, the pointers providing guidance for finding the controller state data stored in the non-volatile memory.

3. The method of claim 2 further comprising upon restoring power, reading at least one of the pointers from the designated portion of the non-volatile memory; reading controller state data found in the non-volatile memory in response to the at least one pointer;
and, storing the controller state data into the volatile data storage.

4. The method of claim 1 wherein detecting a lull in the commands from the host comprises clocking time elapsing since a last host command and detecting a lull when the time elapsed exceeds a threshold.

5. The method of claim 1 further comprising, upon restoring power, reading a reduced portion of controller state data from the non-volatile memory, said reduced portion being based upon the host command.

6. The method of claim 5 further comprising, after signaling completion, continuing to read remaining controller state data from the non-volatile memory.

7. A method of operating a memory system comprising:
monitoring commands to the memory system from a host;
initiating entry into hibernation mode in the memory system in response to detecting a lull in the commands from the host;
storing controller state data from volatile data storage to non-volatile memory in response to said initiating;
entering hibernation mode by diminishing power to the volatile data storage, after the controller state data has been stored and while no host command to the memory system is pending;
receiving at the memory system a host command while the memory system is in the hibernation mode;
restoring power to the volatile data storage in response to the host command;
signaling completion of the host command back to the host prior to expiration of a host protocol timeout; and
storing pointers in a designated portion of non-volatile memory of the system, the pointers providing guidance for finding the controller state data stored in the non-volatile memory;
wherein the designated portion of non-volatile memory comprises a first n blocks of reprogrammable non-volatile memory organized into distinct blocks of simultaneously erasable cells, where n blocks is larger than the amount of memory required to store the pointers.

8. The method of claim 7 further comprising reiterating initiating entry into hibernation mode and storing the pointers into a different position within the n blocks in each successive iteration relative to a previous iteration.

9. A method of recovering from hibernation of a memory system comprising:
receiving a host command while the memory system is in a hibernation mode;
restoring power to volatile data storage in response to the host command;
identifying a reduced portion of controller state data based upon the host command;
reading the reduced portion of controller state data from non-volatile memory;
storing the reduced portion of controller state data into the volatile data storage; and
signaling completion of the host command back to the host prior to expiration of a host protocol timeout;
wherein the host command requests a write and further comprising buffering the data to be written in a cache before signaling completion.

10. The method of claim 9 further comprising, after signaling completion, continuing to read remaining controller state data from the non-volatile memory and to store the remaining controller state data into the volatile data storage.

11. The method of claim 9 wherein the host command requests a read and further comprising reading from the non-volatile memory as requested by the host command before signaling completion.

12. The method of claim 9 further comprising writing the data to be written into the non-volatile memory after signaling completion.

13. A method of recovering from hibernation of a memory system comprising:
receiving a host command while the memory system is in a hibernation mode;
restoring power to volatile data storage in response to the host command;
identifying a reduced portion of controller state data based upon the host command;
reading the reduced portion of controller state data from non-volatile memory;
storing the reduced portion of controller state data into the volatile data storage; and
signaling completion of the host command back to the host prior to expiration of a host protocol timeout;
wherein the host command requests a read directed to a memory location and further comprising determining whether data for the memory location has been buffered in a cache before executing a read for that location.

14. The method of claim 13 further comprising returning requested data from the cache to the host if it has been determined that a read is directed to a memory location for which data has been buffered.

15. A removable data storage device comprising:
a memory controller;
volatile data storage including a memory system RAM and a plurality of hardware components, the volatile data storage storing controller state data during operation of the memory system;
non-volatile memory;
program code, encoded onto one of the group consisting of the memory system RAM, the non-volatile memory and a ROM, for self-initiating a hibernation mode that diminishes power to the memory system RAM; and
program code readable by the memory controller upon restoration of power to the memory system RAM to respond to a host command by restoring from the non-volatile memory to the volatile data storage, a reduced portion of controller state data based upon the host command such that the host command is acted upon and completion signaled back to a host processor prior to expiration of a host protocol timeout;
wherein the non-volatile memory comprises reprogrammable non-volatile memory organized into distinct blocks of simultaneously erasable cells.

16. The removable data storage device of claim 15 further comprising a host interface that operates during hibernation mode to detect an incoming host command and for causing power to the memory system RAM to be restored responsive thereto.

17. A removable data storage device comprising:
a memory controller;
volatile data storage including a memory system RAM and a plurality of hardware components, the volatile data storage storing controller state data during operation of the memory system;
non-volatile memory;
program code, encoded onto one of the group consisting of the memory system RAM, the non-volatile memory and a ROM, for self-initiating a hibernation mode that diminishes power to the memory system RAM; and
program code readable by the memory controller upon restoration of power to the memory system RAM to respond to a host command by restoring from the non-volatile memory to the volatile data storage, a reduced portion of controller state data based upon the host command such that the host command is acted upon and completion signaled back to a host processor prior to expiration of a host protocol timeout; and
program code, responsive to a write host command after restoration of power to the memory system RAM, for buffering write data in a cache.

18. A removable data storage device comprising:
a memory controller;
volatile data storage including a memory system RAM and a plurality of hardware components, the volatile data storage storing controller state data during operation of the memory system;
non-volatile memory;
program code, encoded onto one of the group consisting of the memory system RAM, the non-volatile memory and a ROM, for self-initiating a hibernation mode that diminishes power to the memory system RAM; and
program code readable by the memory controller upon restoration of power to the memory system RAM to respond to a host command by restoring from the non-volatile memory to the volatile data storage, a reduced portion of controller state data based upon the host command such that the host command is acted upon and completion signaled back to a host processor prior to expiration of a host protocol timeout; and
program code, responsive to a read host command directed to a memory location for determining whether data for the memory location has been buffered in a cache before executing a read for that location.

* * * * *